(12) United States Patent
Kurokawa (10) Patent No.: US 10,949,740 B2
(45) Date of Patent: Mar. 16, 2021

(54) MACHINE LEARNING DEVICE, NUMERICAL CONTROLLER, MACHINE TOOL SYSTEM, MANUFACTURING SYSTEM, AND MACHINE LEARNING METHOD FOR LEARNING DISPLAY OF OPERATION MENU

(71) Applicant: FANUC CORPORATION, Yamanashi (JP)

(72) Inventor: Yuuki Kurokawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 969 days.

(21) Appl. No.: 15/420,265

(22) Filed: Jan. 31, 2017

(65) Prior Publication Data
US 2017/0228644 A1 Aug. 10, 2017

(30) Foreign Application Priority Data
Feb. 5, 2016 (JP) .............................. JP2016-020684

(51) Int. Cl.
| | | |
|---|---|---|
| G06N 3/08 | (2006.01) | |
| G05B 19/409 | (2006.01) | |
| G05B 13/02 | (2006.01) | |
| G06N 3/04 | (2006.01) | |
| G06N 3/00 | (2006.01) | |
| G05B 19/4155 | (2006.01) | |

(52) U.S. Cl.
CPC ............ *G06N 3/08* (2013.01); *G05B 13/0275* (2013.01); *G05B 19/409* (2013.01); *G05B 19/4155* (2013.01); *G06N 3/006* (2013.01); *G06N 3/04* (2013.01); *G06N 3/084* (2013.01); *G05B 2219/32128* (2013.01); *G05B 2219/32335* (2013.01); *G05B 2219/36133* (2013.01); *G05B 2219/36137* (2013.01)

(58) Field of Classification Search
CPC ............ G06N 3/04; G06N 3/006; G06N 3/08; G06N 3/084; G05B 19/04; G05B 19/409; G05B 19/4155; G05B 13/0275; G05B 2219/36133; G05B 2219/36137; G05B 2219/32128; G05B 2219/32335
USPC ........................................................ 706/11
See application file for complete search history.

(56) References Cited

U.S. PATENT DOCUMENTS

| | | | | |
|---|---|---|---|---|
| 2009/0199134 A1* | 8/2009 | Murayama | ........ | H04M 1/72586 715/835 |
| 2009/0248175 A1* | 10/2009 | Eguchi | ................. | G05B 13/048 700/30 |

(Continued)

FOREIGN PATENT DOCUMENTS

| | | |
|---|---|---|
| CN | 103153578 A | 6/2013 |
| JP | 2001-356805 A | 12/2001 |

(Continued)

*Primary Examiner* — Shane D Woolwine
(74) *Attorney, Agent, or Firm* — Hauptman Ham, LLP (57) ABSTRACT

A machine learning device, which detects an operator, communicates with a database registering information concerning the operator, and learns display of an operation menu based on the information concerning the operator, includes a state observation unit which observes an operation history of the operation menu; and a learning unit which learns the display of the operation menu on the basis of the operation history of the operation menu observed by the state observation unit.

14 Claims, 8 Drawing Sheets

(56) References Cited

U.S. PATENT DOCUMENTS

| | | | |
|---|---|---|---|
| 2013/0103184 A1* | 4/2013 | Morikawa | B22D 17/32 |
| | | | 700/197 |
| 2013/0173031 A1 | 7/2013 | Liang et al. | |
| 2015/0302730 A1* | 10/2015 | Geerlings | G07C 9/20 |
| | | | 340/5.25 |
| 2016/0216855 A1* | 7/2016 | Choudhary | G06F 3/0481 |

FOREIGN PATENT DOCUMENTS

| | | |
|---|---|---|
| JP | 2004-355392 A | 12/2004 |
| JP | 200635388 A | 2/2006 |
| JP | 2009-086964 A | 4/2009 |
| JP | 2009129366 A | 6/2009 |
| JP | 2009-181501 A | 8/2009 |
| JP | 2009271771 A | 11/2009 |
| JP | 2010-127814 A | 6/2010 |
| JP | 2011221843 A | 11/2011 |
| JP | 4836911 B2 | 12/2011 |
| JP | 20124181 A | 1/2012 |
| JP | 2014178213 A | 9/2014 |

* cited by examiner

MACHINE LEARNING DEVICE, NUMERICAL CONTROLLER, MACHINE TOOL SYSTEM, MANUFACTURING SYSTEM, AND MACHINE LEARNING METHOD FOR LEARNING DISPLAY OF OPERATION MENU

RELATED APPLICATIONS

The present application claims priority to Japanese Patent Application No. 2016-020684 filed Feb. 5, 2016, the disclosure of which is hereby incorporated by reference herein in its entirety.

BACKGROUND OF THE INVENTION

1. Field of the Invention

The present invention relates to a machine learning device, a numerical controller, a machine tool system, a manufacturing system, and a machine learning method for learning display of an operation menu.

2. Description of the Related Art

Conventionally, for example, an NC (Numerical Control) device which controls a machine tool has an operation menu used by a variety of persons (operators). Examples of the operators include persons having various roles and authority levels, such as a developer and a person in charge of an MTB (Machine Tool Builder), an operator (user), and a field engineer.

In the present specification, the NC device also includes, e.g., a CNC (Computer Numerical Control) device. An operation menu for the NC device is displayed on a display device, such as a liquid crystal panel having a touch (position input) function, and is configured to change in accordance with the information displayed on the display device. A display device which displays an operation menu can be, for example, provided integrally with the NC device, but it may also be located at a position away from the NC device in a wired or wireless configuration, or an operation menu on a display device may even be operated in, e.g., the vicinity of a machine tool.

Conventionally, for example, a proposal has been presented to arrange function icons in a matrix as cells and rearrange the function icons in an arrangement desired by the user, in accordance with the numbers of times the icons are used (e.g., Japanese Laid-Open Patent Publication No. 2009-181501). Another proposal has been presented to rearrange menu items in an order suitable for the current user situation, without troubling the user, when a menu for a navigation device is displayed (e.g., Japanese Laid-Open Patent Publication No. 2010-127814). It is also possible to, e.g., set an authority level for an operator who operates a machine tool and change the operation menu in accordance with the authority level (e.g., Japanese Laid-Open Patent Publication No. 2009-086964).

As described above, simply performing arrangement in accordance with the numbers of times menus are used may, for example, result in poor access to a menu desired to be used when a person other than an operator who usually operates the machine, such as a field engineer, operates. A method for detecting an operator and then, for example, rearranging the menus in accordance with the numbers of times they are used for each operator may be possible, but in this case, to obtain a menu screen easy for the user to use, the operator may preferably operate the machine to a certain extent to make the machine perform learning.

When a table defining the order of display items of menus from parameters is prepared in advance to display a menu suitable for the circumstances involved, since changes from assumed circumstances may not be handled dynamically, it may be preferable to manually regenerate a table every time the role or the authority level of an operating person increases.

In consideration of the above-described problems of the conventional techniques, it is an object of the present invention to provide a machine learning device, a numerical controller, a machine tool system, a manufacturing system, and a machine learning method which can display an operation menu optimum for each operator.

SUMMARY OF INVENTION

According to a first aspect of the present invention, there is provided a machine learning device which detects an operator, communicates with a database registering information concerning the operator, and learns display of an operation menu based on the information concerning the operator, the device including a state observation unit which observes an operation history of the operation menu; and a learning unit which learns the display of the operation menu on the basis of the operation history of the operation menu observed by the state observation unit.

The operation history of the operation menu may include an access count to the operation menu and transition information of the operation menu. The state observation unit may further include at least one of information concerning a currently-selected operation menu, information indicating whether a machine tool is in processing operation, alarm information of a numerical controller and the machine tool, and information indicating whether program editing is in progress. The machine learning device may further include a decision unit which decides a position and an order of an operation menu to be displayed on a display device by referring to the display of the operation menu learned by the learning unit.

The learning unit may include a reward computation unit which computes a reward on the basis of output from the state observation unit; and a value function update unit which updates a value function for determining a value of a position and an order in an operation menu to be displayed on a display device, in accordance with the reward on the basis of outputs from the state observation unit and the reward computation unit. The reward computation unit may provide a positive reward when operation is performed from a menu of the operation menu arranged in a position and an order easy to access, and provide a negative reward when operation is performed from a menu of the operation menu arranged in a position and an order hard to access.

The learning unit may include an error computation unit which computes an error on the basis of input teacher data and output from the state observation unit; and a learning model update unit which updates a learning model for determining an error of a position and an order of an operation menu to be displayed on a display device, on the basis of outputs from the state observation unit and the error computation unit. The machine learning device may further include a neural network. The information concerning the operator may include information concerning one of a role and an authority level of the operator, and the operation menu based on the information concerning the operator may change on the basis of the information concerning the one of the role and the authority level of the operator.

According to a second aspect of the present invention, there is provided a numerical controller including a detection unit which detects the operator; a communication unit which communicates with a database registering information concerning the operator; the machine learning device according to the above described first aspect; and a display device which displays an operation menu learned by the machine learning device.

According to a third aspect of the present invention, there is provided a machine tool system including a numerical controller; a machine tool controlled by the numerical controller; and the machine learning device according to the above described first aspect.

According to a fourth aspect of the present invention, there is provided a manufacturing system including a plurality of machine tool systems according to the above described third aspect, wherein the machine learning device is mounted in each of the machine tool systems, and the plurality of machine learning devices mounted in the plurality of machine tool systems are configured to share or exchange data with each other via a communication medium. The machine learning device may be located on a cloud server.

According to a fifth aspect of the present invention, there is provided a machine learning method for detecting an operator, communicating with a database registering information concerning the operator, and learning display of an operation menu based on the information concerning the operator, the method including observing an operation history of the operation menu; and learning the display of the operation menu on the basis of the observed operation history of the operation menu. The operation history of the operation menu may include an access count to the operation menu and transition information of the operation menu.

BRIEF DESCRIPTION OF THE DRAWINGS

The present invention will be more clearly understood by reference to the accompanying drawings, in which.

DETAILED DESCRIPTION

Figure 1:
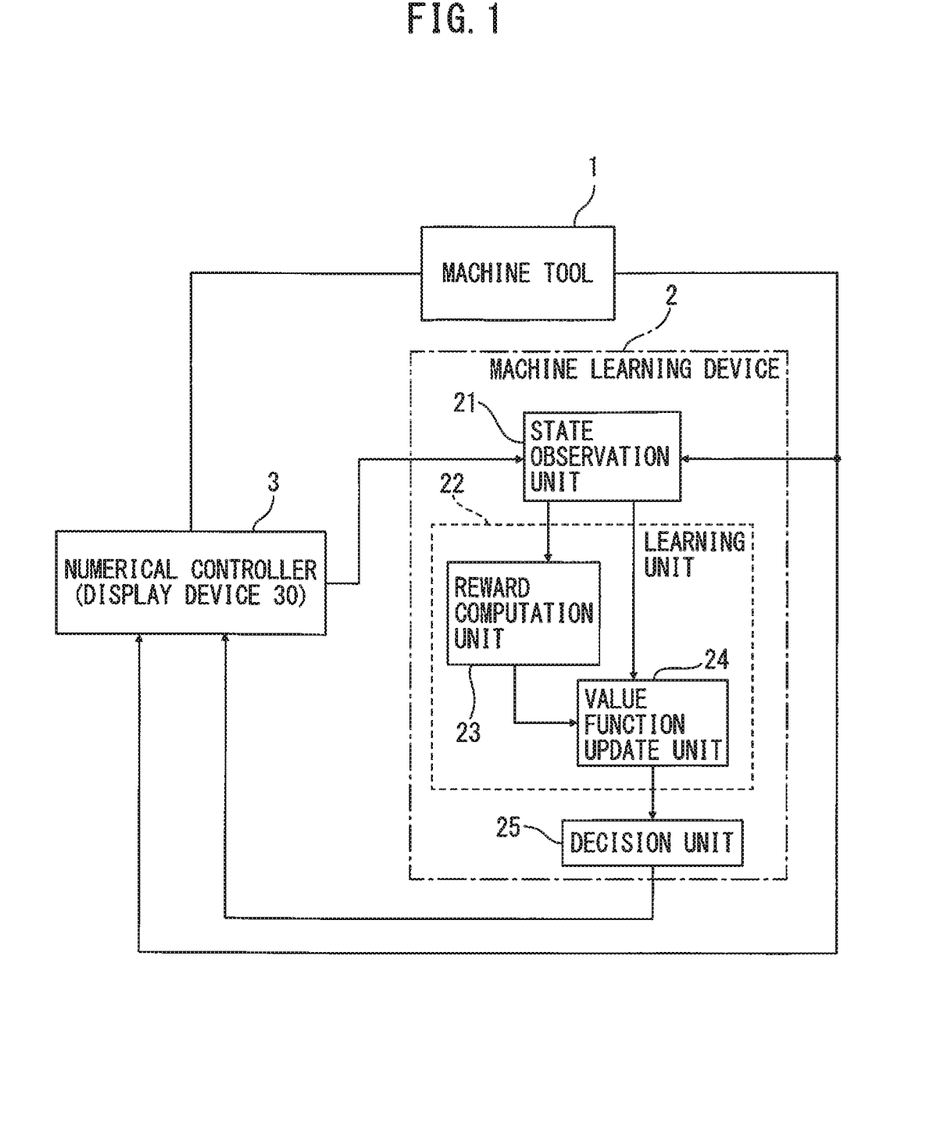
FIG. 1 is a block diagram schematically illustrating an embodiment of a machine tool system according to the present invention.

An embodiment of a machine learning device, a numerical controller, a machine tool system, a manufacturing system, and a machine learning method according to the present invention will be described in detail below with reference to the accompanying drawings. FIG. 1 is a block diagram schematically illustrating an embodiment of a machine tool system according to the present invention.

The machine tool system includes a machine tool 1, a machine learning device 2, and a numerical controller (NC or CNC device) 3, as illustrated as FIG. 1. The machine tool 1 includes, e.g., a lathe, a drill press, a boring machine, a milling machine, a grinding machine, a gear cutting/gear finishing machine, a machining center, an electric discharge machine, a punch press, a laser processing machine, a conveyor, and a plastic injection molding machine, and is controlled by the numerical controller 3. Referring to FIG. 1, the machine learning device 2 is provided independently of the numerical controller 3, but it may also be provided as a part of the numerical controller 3. A display device 30 is implemented as, e.g., a liquid crystal panel having a touch function and displays an operation menu for the numerical controller 3. The display device 30 may be provided integrally with the numerical controller 3, but it may be located at a position away from the numerical controller 3 in a wired or wireless configuration.

The machine learning device 2 is configured to, e.g., learn display of an operation menu on the display device 30 and includes a state observation unit 21, a learning unit 22, and a decision unit 25. The state observation unit 21 observes state variables including the operation history of the operation menu, such as the access count to the operation menu and transition information of the operation menu. The state observation unit 21 can further observe as state variables, at least one of information concerning a currently-selected operation menu, information indicating whether a machine tool is in processing operation, alarm information of a numerical controller and the machine tool, and information indicating whether program editing is in progress.

The state observation unit 21 can receive from the numerical controller 3, e.g., the access count to the operation menu, transition information of the operation menu, information concerning a currently-selected operation menu, information indicating whether the machine tool 1 is in processing operation, alarm information of the numerical controller 3, and information indicating whether program editing is in progress. The state observation unit 21 can further receive from the machine tool 1, e.g., information indicating whether the machine tool 1 is in processing operation, and alarm information of the machine tool.

The learning unit 22 is configured to learn display of an operation menu on the basis of the state variable observed by the state observation unit 21, and includes a reward computation unit 23 and a value function update unit 24. The reward computation unit 23 computes a reward on the basis of output from the state observation unit 21, and the value function update unit 24 updates a value function for determining the value of the position and the order in an operation menu to be displayed on the display device 30, in accordance with the reward on the basis of outputs from the state observation unit 21 and the reward computation unit 23. Note that the reward computation unit 23, for example, provides a positive reward when operation is performed from a menu of the operation menu arranged in a position and an order easy to access, and provides a negative reward when operation is performed from a menu of the operation menu arranged in a position and an order hard to access. This operation will be described later with reference to FIG. 5.

Figure 2:
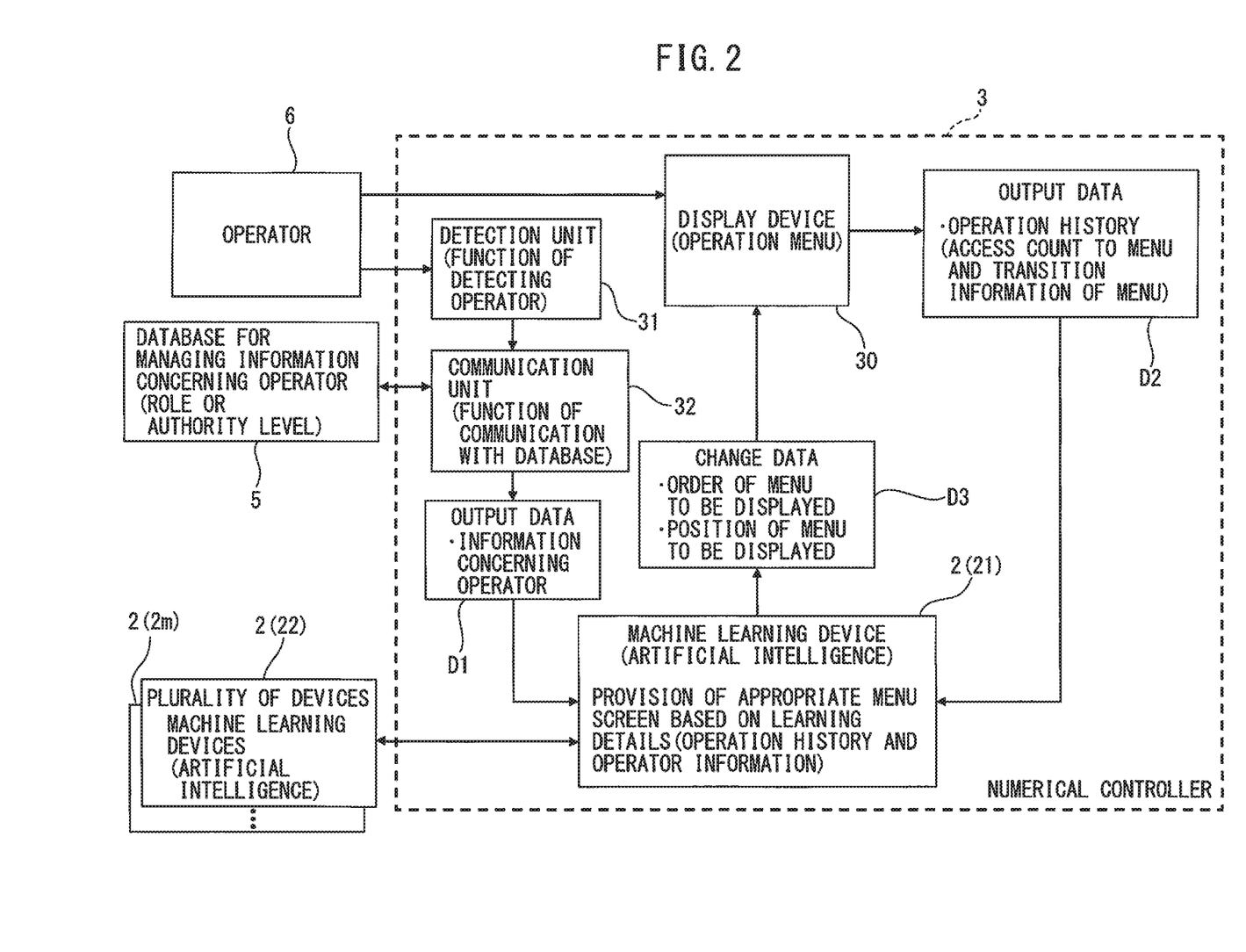
FIG. 2 is a block diagram illustrating an embodiment of a numerical controller according to the present invention.

FIG. 2 is a block diagram illustrating an embodiment of a numerical controller according to the present invention and illustrates an example of the machine learning device 2, illustrated as FIG. 1, as mounted in the numerical controller 3. FIG. 2 also illustrates how a plurality of machine learning devices 2 (21, 22, . . . , 2*n*) share or exchange data with each other via a communication medium.

The numerical controller 3 includes the above-mentioned display device 30 that displays the operation menu, a detection unit 31, a communication unit 32, and a machine learning device 2 (21), as depicted as FIG. 2. The detection unit 31 detects an operator 6 on the basis of a predetermined operation by the operator 6, for example, on the basis of input of a predetermined code by the operator 6 or reading of an IC card held over the detection unit 31 by the operator 6. The communication unit 32 communicates with a database 5 located, for example, outside the numerical controller 3, on the basis of output from the detection unit 31.

The database 5 registers information concerning the operator 6 in advance, such as the role or the authority level of the operator 6. In other words, data D1 output from the communication unit 32 to the machine learning device 2 includes information concerning the operator 6 corresponding to the operator 6 detected by the detection unit 31, for example, information concerning various roles and authority levels, such as whether the operator 6 is a developer or a person in charge of a machine tool builder, an operator (user), or a field engineer.

The detection unit 31 is not limited to a keyboard operated by the operator 6 and an IC card reader, and various well-known input devices or sensors, for example, are also usable as long as they can detect the operator 6. In the present example, the operation menu preferably changes on the basis of, e.g., information concerning the operator 6 including the role or the authority revel of the detected operator 6. In other words, the machine learning device 2 preferably learns and displays on the display device 30, an operation menu optimum for the role or the authority level of an operator, on the basis of the role or the authority level of the operator.

The plurality of machine learning devices 2 (21 to 2*n*) may be configured to share or exchange data with each other via a communication medium, as depicted as FIG. 2. In, e.g., a machine tool factory including a plurality of machine tools 1 each controlled by the numerical controller 3, i.e., in a manufacturing system including a plurality of machine tool systems (1 and 2), the machine learning device 2 (21 to 2*n*) of each machine tool system can share or exchange data with each other via a communication medium. A machine learning device 2 (21 to 2*n*) may be located, for example, on a cloud server instead of being mounted in each numerical controller 3.

As described with reference to FIG. 1, the machine learning device 2 (state observation unit 21), for example, receives the operation history of the operation menu (state variables: e.g., the access count to the operation menu and transition information of the operation menu) as data D2 output from the display device 30, performs machine learning (e.g., reinforcement learning), and controls change data D3 (manipulated variables: e.g., the order of menu to be displayed and the position of the menu to be displayed) for controlling an operation menu to be displayed on the display device 30. Note that FIG. 2 is merely an example and various modifications and changes may be made.

According to the present embodiment, when, for example, the operator operates a machine (machine tool system) for the first time, the machine learning device 2 can present appropriate menu display to a certain extent from the start as long as the operation history of a person in a role or an authority level close to that of the operator has been learned. Further, it gradually becomes possible to present appropriate menu display without generating a dedicated table every time the role or the authority level of an operating person increases.

The machine learning device 2 has the function of extracting, e.g., a useful rule, a knowledge representation, and a determination criterion by analysis from a set of data input to the device, outputting the determination results, and learning knowledge (machine learning). A variety of machine learning techniques are available, which are roughly classified into, e.g., "supervised learning," "unsupervised learning," and "reinforcement learning." To implement these techniques, another technique called "deep learning" in which extraction of feature values themselves is learned is available.

The machine learning device 2 illustrated as FIG. 1 employs "reinforcement learning (Q-learning)" and a machine learning device 4 (to be described later with reference to FIG. 9) employs "supervised learning." Although these types of machine learning (machine learning devices 2 and 4) may use a general-purpose computer or processor, the use of, e.g., GPGPU (General-Purpose computing on Graphics Processing Units) or large-scale PC clusters allows higher-speed processing.

First, in supervised learning, a large number of sets of teacher data, i.e., data of certain inputs and results (labels) are fed into a machine learning device to learn features seen in these data sets and inductively acquire a model (error model) for estimating the result from the input, i.e., their relationship. Supervised learning can be implemented using an algorithm such as a neural network (to be described later).

In unsupervised learning, only input data are fed into a machine learning device in large amounts to learn the distribution of the input data to, e.g., compress, classify, and shape the input data without corresponding teacher output data. This allows, e.g., clustering of features seen in these data sets into similar features. The obtained result can be used to define some norm and allocate outputs to optimize it, thus predicting output.

Intermediate problem setting between unsupervised learning and supervised learning, called semi-supervised learning, is also available and applies when, for example, only some data serve as data sets of inputs and outputs and the remaining data include only inputs. In the present embodiment, learning can be efficiently performed by applying data (e.g., image data or simulation data) which can be obtained even without actual movement of the machine tool system (machine tool 1 and numerical controller 3) to unsupervised learning.

Reinforcement learning will be described below. Reinforcement learning problem setting will be considered as follows:

- A machine tool system (i.e., a machine tool and a numerical controller: to be also referred to as a numerical controller hereinafter for the sake of simplicity) observes the environmental state to decide its action;
- The environment may change according to any rule and the machine tool system may change the environment by its own action;
- A reward signal is returned every time an action is taken;
- The sum of (discount) rewards in the future is to be maximized;
- Learning starts in the state in which a result brought about by the action is totally unknown or known only incompletely. In other words, the numerical controller can obtain the result of the action as data only after it actually takes action. This means that an optimal action may be preferably searched for by trial and error; and Learning can be started at a good starting point assuming that the state in which learning has been performed in advance to imitate human behaviors (a technique such as the above-mentioned supervised learning or reverse reinforcement learning) is initial.

In reinforcement learning, in addition to determination and classification, an action is learned to acquire a method for learning an appropriate action in consideration of interactions exerted on the environment by the action, i.e., learning to maximize the reward to be obtained in the future. Although this description will be followed by an example of Q-learning, the present invention is not limited to Q-learning.

In Q-learning, a value Q(s, a) of selecting an action a is learned in a particular environmental state s. In other words, an action a having the highest value Q(s, a) in the particular state s may be preferably selected as an optimal action. However, at first, a correct value of the value Q(s, a) is totally unknown for a pair of the state s and the action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a)=E[\Sigma(\gamma^t)r_t]$ is to be finally satisfied. Note that the expected value is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount rate, satisfying 0<γ≤1. α is a learning factor satisfying 0<α≤1.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, the above-mentioned expression (1) can be implemented by adjusting the parameter of an approximation function using a technique such as the stochastic gradient descent method. A neural network (to be described later) can be used as the approximation function.

Figure 3:
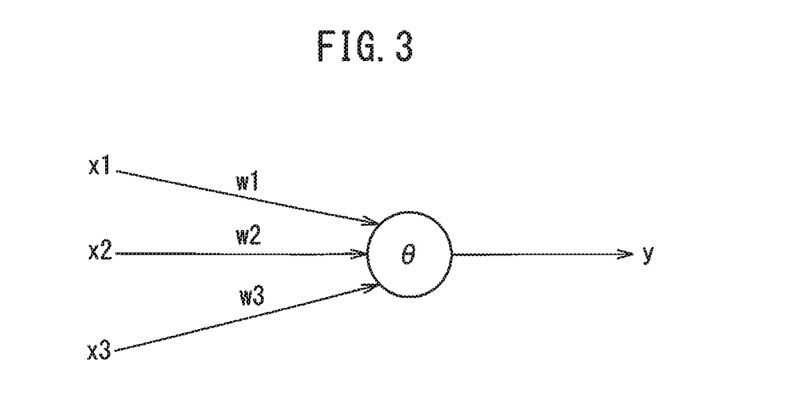
FIG. 3 is a diagram schematically representing a model for a neuron.
Figure 4:
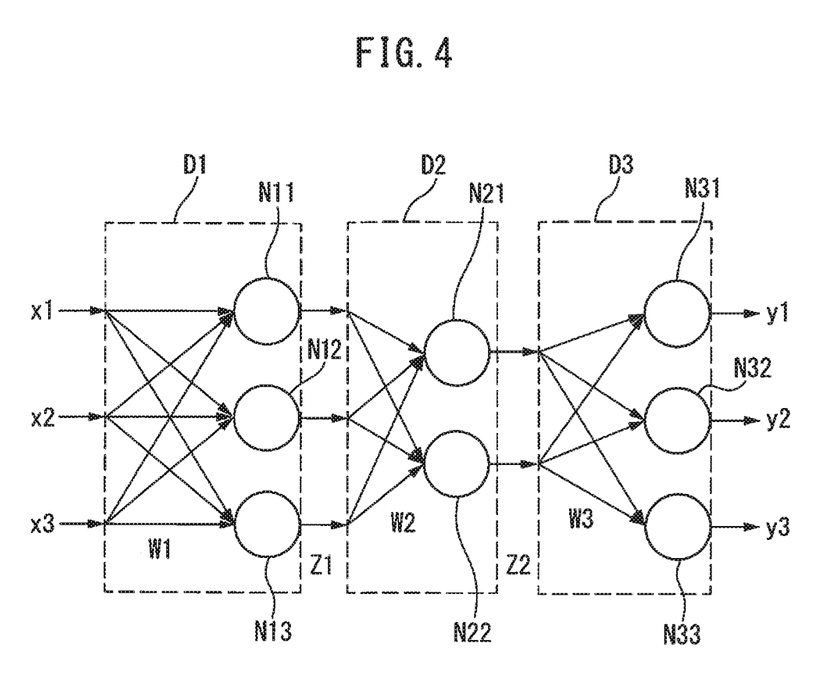
FIG. 4 is a diagram schematically representing a three-layer neural network formed by combining neurons as illustrated as FIG. 3 together.

Neural networks can also be used as approximation algorithms for value functions in reinforcement learning. FIG. 3 is a diagram schematically representing a model for a neuron, and FIG. 4 is a diagram schematically representing a three-layer neural network formed by combining neurons as illustrated as FIG. 3 together. More specifically, the neural network is implemented by, e.g., an arithmetic device imitating a model for a neuron as illustrated as, e.g., FIG. 3, and a memory.

As illustrated as FIG. 3, the neurons serve to output, output (result) y for a plurality of inputs x (FIG. 3 illustrates inputs x1 to x3 as an example). Each input x (x1, x2, x3) is multiplied by a weight w (w1, w2, w3) corresponding to the input x. With this operation, the neurons output results y given by:

$$y = f_k(\Sigma_{i=1}^n x_i w_i - \theta) \quad (2)$$

where θ is the bias and $f_k$ is the activation function. Note that all of the input x, the result y, and the weight w are vectors.

A three-layer neural network formed by combining neurons as illustrated as FIG. 3 together will be described below with reference to FIG. 4. A plurality of inputs x (inputs x1 to x3 are taken as an example herein) are input from the left of the neural network and results y (results y1 to y3 are taken as an example herein) are output from the right of this network, as illustrated as FIG. 4. More specifically, the inputs x1, x2 and x3 are multiplied by a weight corresponding to each of them and input to three neurons N11 to N13. The weights used to multiply these inputs are collectively denoted by W1 herein.

The neurons N11 to N13 output z11 to z13, respectively. Referring to FIG. 4, z11 to z13 are collectively referred to as feature vectors Z1 and may be regarded as vectors obtained by extracting the feature values of input vectors. The feature vectors Z1 are defined between the weights W1 and W2. z11 to z13 are multiplied by a weight corresponding to each of them and input to two neurons N21 and N22. The weights used to multiply these feature vectors are collectively denoted by W2 herein.

The neurons N21 and N22 output z21 and z22, respectively. Referring to FIG. 4, z21 and z22 are collectively referred to as feature vectors Z2. The feature vectors Z2 are defined between the weights W2 and W3. z21 and z22 are multiplied by a weight corresponding to each of them and input to three neurons N31 to N33. The weights used to multiply these feature vectors are collectively denoted by W3 herein.

Lastly, the neurons N31 to N33 output results y1 to y3, respectively. The operation of the neural network includes a learning mode and a value prediction mode. For example, the weight W is learned using a learning data set in the learning mode, and the action of a numerical controller is determined in the prediction mode using the parameter. Although "prediction" has been referred to above for the sake of convenience, a variety of tasks such as detection, classification, and inference are possible, as a matter of course.

Data obtained by actually operating the numerical controller in the prediction mode can be immediately learned and reflected on the subsequent action (online learning), or a group of data collected in advance can be used to perform collective learning and since then the detection mode can be executed using the same parameters (batch learning). As another, intermediate approach, the learning mode can be interposed every time a certain amount of data is accumulated.

The weights W1 to W3 can be learned by the error backpropagation method. The information of errors enters from the right and flows to the left. The error backpropagation method is used to adjust (learn) each weight to reduce the difference between the true output y (teacher) and the output y when the input x is input, for each neuron. Such a neural network can have more than three layers (called deep learning). It is possible to extract features of the input stepwise to automatically acquire an arithmetic device which returns a result, from only teacher data.

In view of this, the machine learning device 2 according to the present example includes, e.g., a state observation unit 21, a learning unit 22, and a decision unit 25 to execute Q-learning, as described above. However, the machine learning method applied to the present invention is not limited to Q-learning. Machine learning (machine learning device 2) can be implemented by adopting, e.g., GPGPU or large-scale PC clusters, as mentioned earlier.

Figure 5:
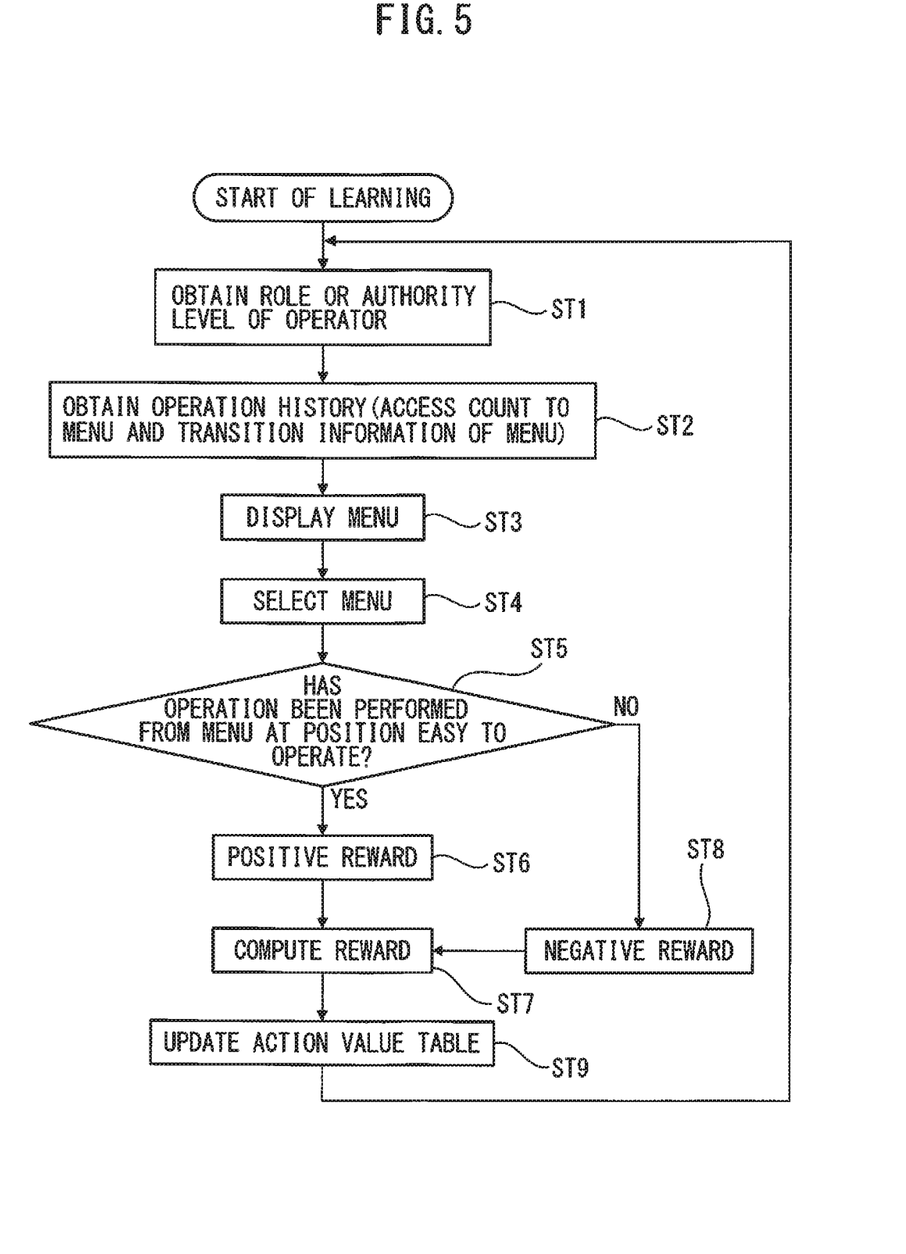
FIG. 5 is a flowchart illustrating an exemplary operation of a machine learning device illustrated as FIG. 1.

FIG. 5 is a flowchart illustrating an exemplary operation of a machine learning device illustrated as FIG. 1. As illustrated as FIG. 5, when machine learning is started (at the start of learning), the role or the authority level of an operator is obtained in step ST1 and the process advances to step ST2. In step ST2, an operation history is obtained and the process advances to step ST3. The operation history includes, e.g., the access count to the menu and transition information of the menu.

Menus are displayed in step ST3, the operator selects a menu in step ST4, and it is determined in step ST5 whether operation is performed from a menu at a position easy to operate. When it is determined that operation is performed from a menu at a position hard to operate, the process advances to step ST8, in which a negative reward is set; or when it is determined that operation is performed from a menu at a position easy to operate, the process advances to step ST6, in which a positive reward is set.

In this manner, the rewards set in steps ST6 and ST8 are summed by reward computation in step ST7 and the process advances to step ST9, in which the action value table is updated on the basis of the reward computed in step ST7.

In other words, the value function update unit 24 updates the value function (action value table). Then, for example, the decision unit 25 decides the position and the order of an operation menu to be displayed on the display device 30, in accordance with the value function updated by the value function update unit 24. After the process in step ST9 is ended, the process returns to step ST1, in which the same processes are repeated. In this manner, according to the present embodiment, an operation menu optimum for each operator can be displayed.

Figure 6A:
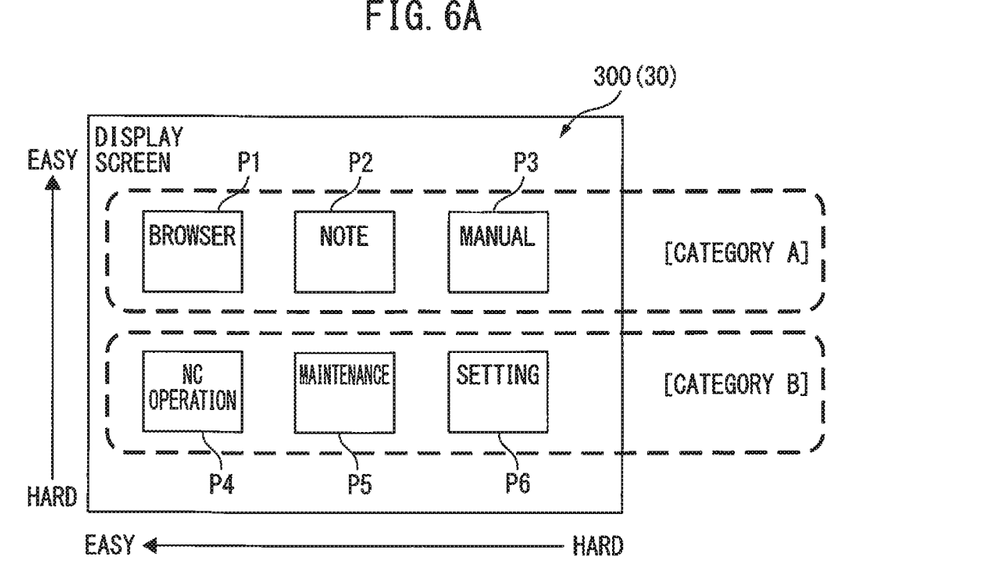
FIG. 6A and FIG. 6B are diagrams (1) for explaining display of an operation menu learned by the machine learning device illustrated as FIG. 5.

FIG. 6A to FIG. 8B are diagrams for explaining display of an operation menu learned by the machine learning device illustrated as FIG. 5. FIG. 6A and FIG. 6B are diagrams for explaining how the operation menu is updated (learned) on the basis of the access count to the operation menu (state variable), and FIG. 7A to FIG. 8B are diagrams for explaining how an operation menu is learned on the basis of transition information of the operation menu (state variable). For the sake of simplicity, in each drawing (a display screen 300 of the display device 30 which displays an operation menu), positions easy to operate in the operation menu are defined to be on the upper and left sides and positions hard to operate in the operation menu on the lower and right sides, for example.

Figure 6B:
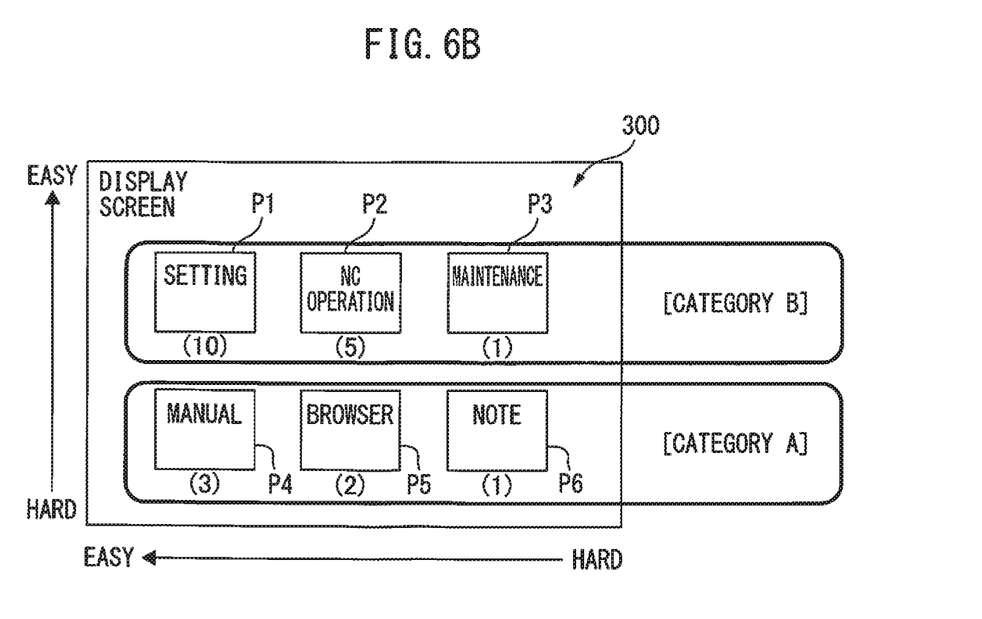

FIG. 6A illustrates an initial operation menu (home screen) and FIG. 6B illustrates an example in which a particular operator (e.g., a person in charge of an MTB (Machine Tool Builder)) accesses it. Reference numerals P1 to P6 denote the positions of respective icons in the operation menu displayed on the display screen 300 of the display device 30. As illustrated as FIG. 6A, in the initial operation menu, a "Browser" icon is displayed at position P1 of the display screen 300, a "Note" icon is displayed at position P2, and a "Manual" icon is displayed at position P3. An "NC Operation" icon is displayed at position P4 of the display screen 300, a "Maintenance" icon is displayed at position P5, and a "Setting" icon is displayed at position P6.

The "Browser" icon is used in referring to the Internet, the "Note" icon is used in displaying a note screen, and the "Manual" icon is used in referring to a manual. These "Browser," "Note," and "Manual" icons are arranged in the row direction to constitute [Category A]. The "NC Operation" icon is used in, e.g., generating a processing program and checking the processing state, the "Maintenance" icon is used in, e.g., checking alarm information of the machine, and the "Setting" icon is used in, e.g., setting parameters. These "NC Operation," "Maintenance," and "Setting" icons are arranged in the row direction to constitute [Category B].

As illustrated as FIG. 6B, when, for example, a person in charge of the MTB accesses the operation menu (display screen 300) as an operator 6, and each icon has been operated the following number of times: the "Browser" icon has been operated twice; the "Note" icon has been operated once; the "Manual" icon has been operated three times; the "NC Operation" icon has been operated five times; the "Maintenance" icon has been operated once; and the "Setting" icon has been operated 10 times, the icons constituting [Category A] have been operated a total of six times and the icons constituting [Category B] have been operated a total of 16 times, so that [Category B] is changed to the upper row easier to operate than [Category A].

In each of [Category A] and [Category B], the icons are arranged in descending order of number of times they have been operated, from the left side easy to operate. In other words, the "Setting" icon is displayed at the position P1, the "NC Operation" icon is displayed at the position P2, and the "Maintenance" icon is displayed at the position P3. The "Manual" icon is displayed at the position P4, the "Browser" icon is displayed at the position P5, and the "Note" icon is displayed at the position P6.

Figure 7A:
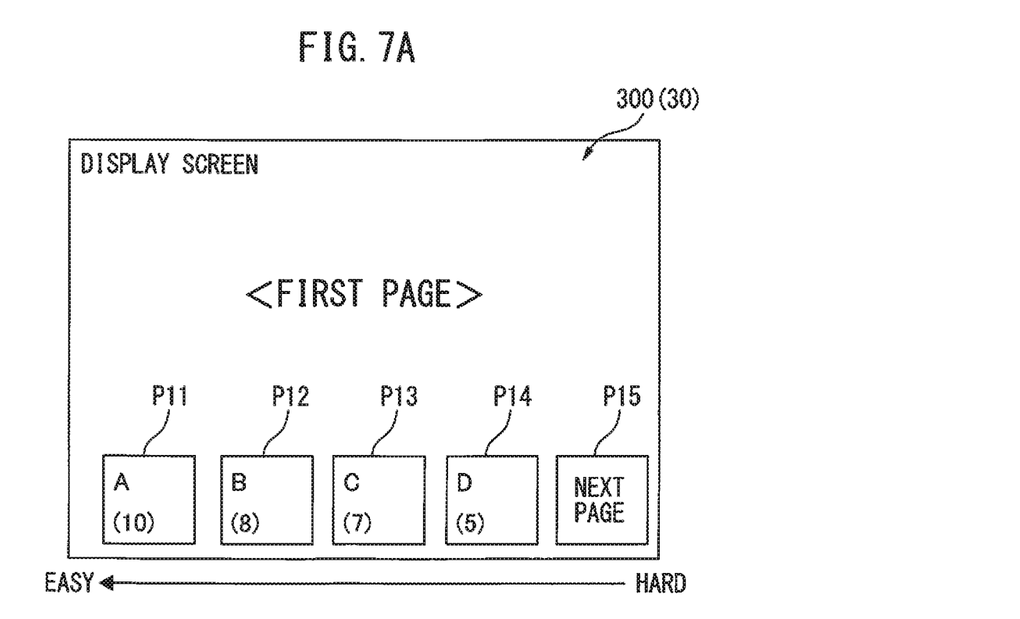
FIG. 7A and FIG. 7B are diagrams (2) for explaining the display of the operation menu learned by the machine learning device illustrated as FIG. 5.
Figure 7B:
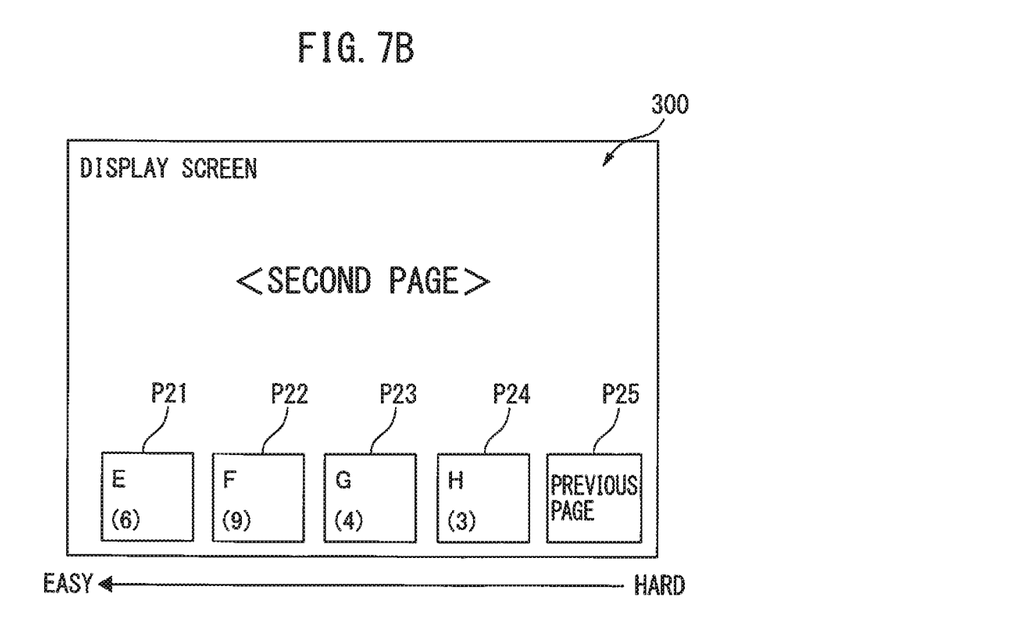

FIG. 7A and FIG. 7B illustrate an exemplary operation menu displayed on the display screen 300 after, for example, a person in charge of the MTB operates (by, e.g., a touch operation) the "Setting" icon illustrated as FIG. 6A as an operator 6, and two display screens (operation menus) of <First Page> and <Second Page> can be selected using "Next Page" and "Previous Page" icons. Reference numerals P11 to P15 and P21 to P25 denote the positions of respective icons in the operation menus of <First Page> and <Second Page> displayed on the display screen 300 of the display device 30. The "Next Page" icon on the display screen of <First Page> is fixed at position P15 and the "Previous Page" icon on the display screen of <Second Page> is fixed at position P25.

Figure 8A:
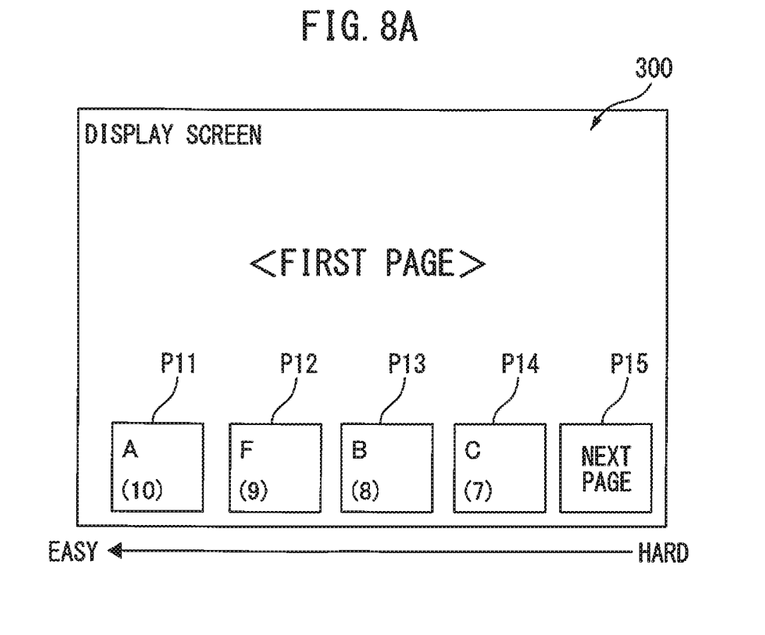
FIG. 8A and FIG. 8B are diagrams (3) for explaining the display of the operation menu learned by the machine learning device illustrated as FIG. 5.
Figure 8B:
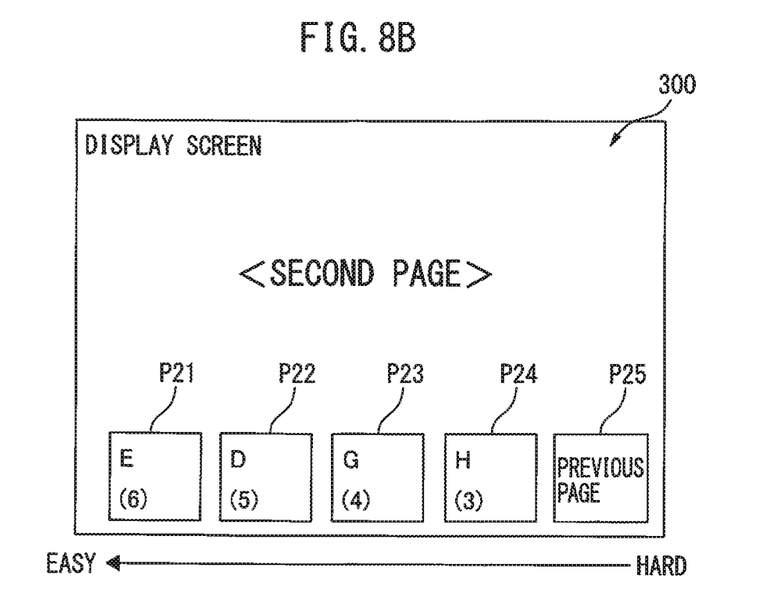

The machine learning device 2 performs machine learning, on the basis of the number of times icons "A" to "H" have been operated by a person in charge of the MTB as an operator 6 in the past and, for example, operation menus as depicted as FIG. 8A and FIG. 8B are displayed. When, for example, respective icons "A" to "H" have been operated the following numbers of times: icon "A" has been operated 10 times; icon "B" has been operated eight times; icon "C" has been operated seven times; icon "D" has been operated five times; icon "E" has been operated six times; icon "F"

has been operated nine times; icon "G" has been operated four times; and icon "H" has been operated three times, the icons are arranged in descending order of number of times they have been operated, from the left to the right of <First Page> on which operation is easy, as: "A" at the position P11, "F" at P12, "B" at P13, "C" at P14, and "Next Page" at P15, as illustrated as FIG. 8A, and the icons are arranged in descending order of number of times they have been operated, from the left to the right of <Second Page>, as: "E" at the position P21, "D" at p22, "G" at P23, "H" at P24, and "Previous Page" at P25, as illustrated as FIG. 8B.

Although the foregoing description simplifies the operation history (the access count to the operation menu and transition information of the operation menu) and the operation menu, various modifications and changes may be made to, e.g., the state variables (e.g., the operation history) input to the machine learning device 2, the manipulated variables (e.g., the learned operation menu) output from the machine learning device 2, and the role and the authority level of the operator 6, as a matter of course.

Figure 9:
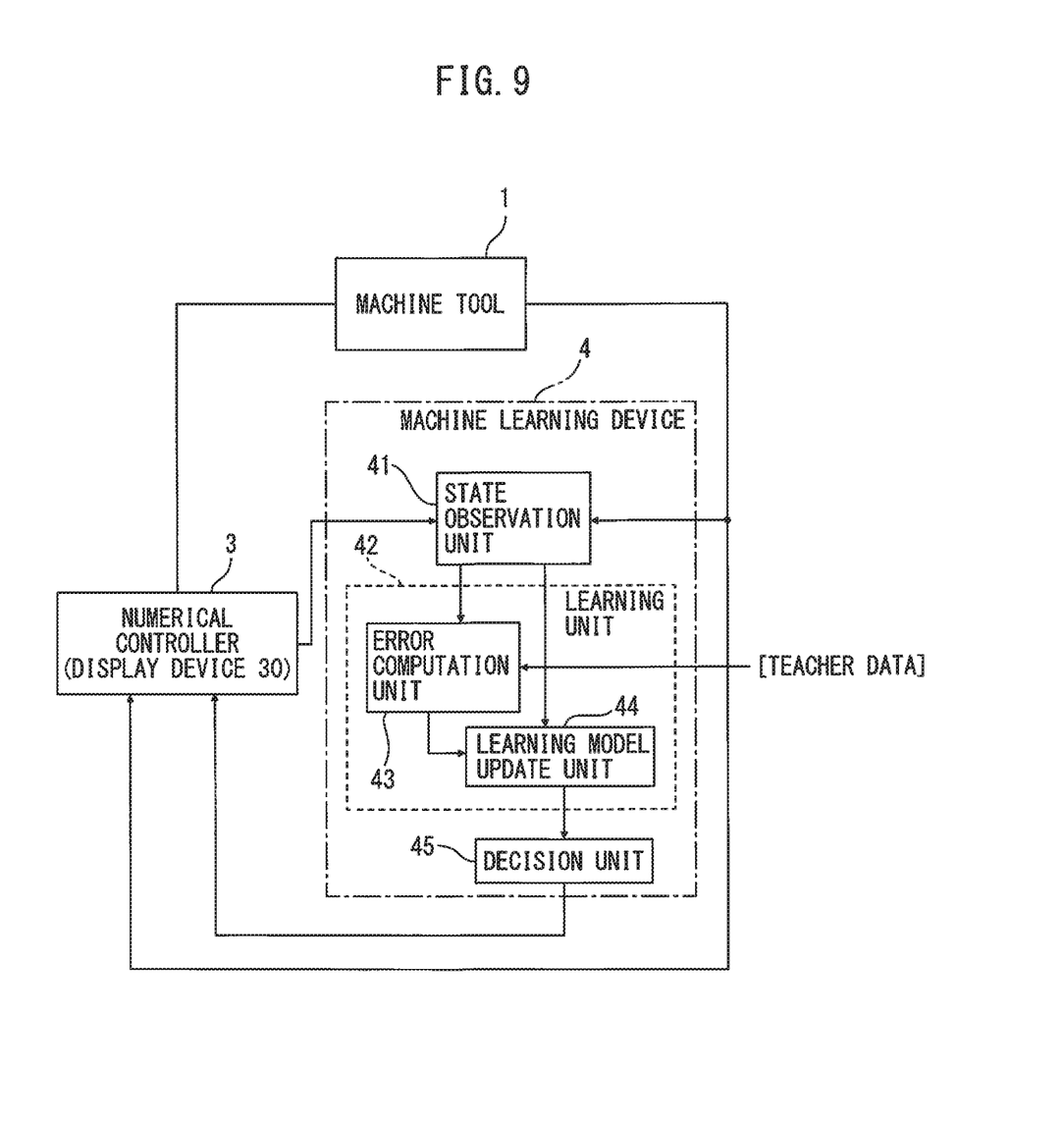
FIG. 9 is a block diagram schematically illustrating another embodiment of a machine tool system according to the present invention.

FIG. 9 is a block diagram schematically illustrating another embodiment of a machine tool system according to the present invention, and illustrates a machine tool system that employs supervised learning. As is obvious from a comparison of FIG. 9 with FIG. 1 mentioned earlier, a machine tool system that employs supervised learning illustrated as FIG. 9 is provided with teacher data (result (label)-bearing data) with respect to the machine tool system that employs Q-learning (reinforcement learning) illustrated as FIG. 1.

A machine learning device 4 in the machine tool system that employs supervised learning includes a state observation unit 41, a learning unit 42, and a decision unit 45, as illustrated as FIG. 9. The learning unit 42 includes an error computation unit 43 and a learning model update unit (error model update unit) 44. In the machine tool system according to the present embodiment as well, the machine learning device 4 learns display of an operation menu on the basis of the operation history of the operation menu.

In other words, the state observation unit 41 observes state variables including the operation history of the operation menu, such as the access count to the operation menu and transition information of the operation menu, like the state observation unit 21 illustrated as FIG. 1. The state observation unit 41 can further observe as state variables, at least one of information concerning a currently-selected operation menu, information indicating whether a machine tool is in processing operation, alarm information of a numerical controller and the machine tool, and information indicating whether program editing is in progress.

As illustrated as FIG. 9, the learning unit 42 includes an error computation unit 43 and a learning model update unit 44, which correspond to the reward computation unit 23 and the value function update unit 24, respectively, in the machine tool system that employs Q-learning illustrated as FIG. 1. Note, however, that the error computation unit 43 in the present embodiment is different from the configuration described with reference to FIG. 1, in, e.g., a configuration which receives external teacher data and uses the learning model update unit 44 to update the learning model (error model) to reduce the difference between the teacher data and the learning model.

In other words, the error computation unit 43 receives teacher data and output from the state observation unit 41 and computes the error between the result (label)-bearing data and the learning model implemented in the learning unit 42. As the teacher data, when, for example, the same task is performed by the same machine tool system, label-bearing data obtained by the day before a predetermined day on which the task is actually performed can be held and provided to the error computation unit 43 as teacher data on the predetermined day.

Alternatively, data obtained through, e.g., simulation performed outside the machine tool system (e.g., the numerical controller or the machine tool) or label-bearing data obtained by another machine tool system may be provided as teacher data to the error computation unit 43 of the machine tool system via a memory card or a communication line. The teacher data (label-bearing data), for example, may even be held in a non-volatile memory such as flash memory built into the learning unit 42 and the label-bearing data held in the non-volatile memory can be directly used in the learning unit 42.

In the foregoing description, assuming a manufacturing system including a plurality of machine tool systems, for example, the machine learning device 2 (4) is mounted in each machine tool system, and the plurality of machine learning devices 2 (4) mounted in the plurality of machine tool systems can share or exchange data with each other via a communication medium. The machine learning device 2 (4) can also be located on a cloud server.

In this manner, the machine learning device according to the present invention may employ not only "reinforcement learning" but also a variety of machine learning techniques such as "supervised learning," "unsupervised learning," or "semi-supervised learning."

With the machine learning device, the numerical controller, the machine tool system, the manufacturing system, and the machine learning method according to the present invention, an operation menu optimum for each operator can be displayed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device configured to detect an operator, communicate with a database registering information concerning the operator, and learn display of an operation menu based on the information concerning the operator, the device comprising:
   a processor configured to:
      observe an operation history of the operation menu, and
      learn the display of the operation menu on the basis of the observed operation history of the operation menu, wherein
   the information concerning the operator comprises information concerning one of a role and an authority level of the operator, and
   the operation menu based on the information concerning the operator changes on the basis of the information concerning the one of the role and the authority level of the operator.

2. The machine learning device according to claim 1, wherein the operation history of the operation menu comprises an access count to the operation menu and transition information of the operation menu.

3. The machine learning device according to claim 1, wherein the processor is configured to receive from a machine tool at least one of
information concerning a currently-selected operation menu,
information indicating whether the machine tool is in processing operation,
alarm information of a numerical controller and the machine tool, and
information indicating whether program editing is in progress.

4. The machine learning device according to claim 1, wherein the processor is further configured to decide a position and an order of an operation menu to be displayed on a display device by referring to the learned display of the operation menu.

5. The machine learning device according to claim 1, wherein the processor is further configured to:
compute a reward on the basis of the observed operation history, and
update a value function for determining a value of a position and an order in an operation menu to be displayed on a display device, in accordance with the reward on the basis of the observed operation history and the computed reward.

6. The machine learning device according to claim 5, wherein the processor is further configured to
provide a positive reward when operation is performed from a menu of the operation menu arranged in a position and an order easy to access, and
provide a negative reward when operation is performed from a menu of the operation menu arranged in a position and an order hard to access.

7. The machine learning device according to claim 1, wherein the processor is further configured to:
compute an error on the basis of input teacher data and the observed operation history of the operation menu, and
update a learning model for determining an error of a position and an order of an operation menu to be displayed on a display device, on the basis of the observed operation history and the computed error.

8. The machine learning device according to claim 1, wherein the machine learning device further comprises a neural network.

9. A numerical controller comprising:
a detection unit which detects the operator;
a communication unit which communicates with a database registering information concerning the operator;
the machine learning device according to claim 1; and
a display device which displays an operation menu learned by the machine learning device.

10. A machine tool system comprising:
a numerical controller;
a machine tool controlled by the numerical controller; and
the machine learning device according to claim 1.

11. A manufacturing system comprising a plurality of machine tool systems according to claim 10, wherein
the machine learning device is mounted in each of the machine tool systems, and
the plurality of machine learning devices mounted in the plurality of machine tool systems are configured to share or exchange data with each other via a communication medium.

12. The manufacturing system according to claim 11, wherein the machine learning device is located on a cloud server.

13. A machine learning method of detecting an operator, communicating with a database registering information concerning the operator, and learning display of an operation menu based on the information concerning the operator, the method comprising:
observing an operation history of the operation menu; and
learning the display of the operation menu on the basis of the observed operation history of the operation menu, wherein
the information concerning the operator comprises information concerning one of a role and an authority level of the operator, and
the operation menu based on the information concerning the operator changes on the basis of the information concerning the one of the role and the authority level of the operator.

14. The machine learning method according to claim 13, wherein the operation history of the operation menu comprises an access count to the operation menu and transition information of the operation menu.

* * * * *